(12) United States Patent
Yui et al.

(10) Patent No.: US 7,056,189 B2
(45) Date of Patent: Jun. 6, 2006

(54) GRINDING METHOD OF A WORKPIECE AND GRINDING APPARATUS

(75) Inventors: Akinori Yui, Yokosuka (JP); Shigeki Okuyama, Yokosuka (JP); Junichi Isono, Annaka (JP)

(73) Assignee: Okamoto Machine Tool Works, Ltd., Annaka-City (JP)

( * ) Notice: Subject to any disclaimer, the term of this patent is extended or adjusted under 35 U.S.C. 154(b) by 0 days.

(21) Appl. No.: 11/223,967

(22) Filed: Sep. 13, 2005

(65) Prior Publication Data

US 2006/0057939 A1    Mar. 16, 2006

(30) Foreign Application Priority Data

Sep. 15, 2004  (JP)  ............................. 2004-267675

(51) Int. Cl.
*B24B 49/00*  (2006.01)

(52) U.S. Cl. ............................. 451/5; 451/11; 451/212; 451/334

(58) Field of Classification Search .................... 451/5, 451/8, 9, 10, 11, 12, 24, 212, 213, 214, 334, 451/361
See application file for complete search history.

(56) References Cited

U.S. PATENT DOCUMENTS 4,821,460 A * 4/1989 Wegmann ..................... 451/26
5,237,779 A * 8/1993 Ota ............................... 451/5

* cited by examiner

*Primary Examiner*—Jacob K. Ackun, Jr.
(74) *Attorney, Agent, or Firm*—Oblon, Spivak, McClelland, Maier & Neustadt, P.C.

(57) ABSTRACT

An adaptive work table-reciprocation control system and method that can reduce a grinding time. The system uses a vibration sensor head installed on a chuck surface in the vicinity of the workpiece to detect a vibration signal emitted from the contact zone between the grinding wheel and the workpiece. When the value of the vibration signals falls below a trigger level, a work table direction of motion is reversed.

18 Claims, 6 Drawing Sheets

*Fig.3B*
METHOD OF THE PRESENT INVENTION

*Fig.3A*
CONVENTIONAL METHOD

GRINDING METHOD OF A WORKPIECE AND GRINDING APPARATUS

BACKGROUND OF THE INVENTION

1. Field of the Invention

The present invention relates to a grinding method in which an acoustic energy sensor detects a vibration signal emitted from the contact zone between a grinding wheel and a workpiece during grinding. Movement of a work table, during grinding of the workpiece, is reversed based on the change of the vibration signal. Another non-limiting embodiment of the present invention relates to a grinding apparatus for grinding a workpiece mounted on a work table which is reversed based on the change of a time-series vibration signal detected by the acoustic energy sensor.

According to the grinding method of the invention, since the reverse position of the work table is determined by the vibration signal generated by the acoustic energy (vibration) sensor according to the contour of the workpiece during grinding, when the workpiece has a shape such as a disk, a star shape, an L shape, an ellipse, a semicircle or a long shape, a reversely reciprocating path of travel of the work table is shortened, and grinding time can be greatly reduced.

2. Discussion of the Background

Various types of grinding apparatuses are known. For example, JP-A-2000-263436 shows a surface grinding apparatus in which a workpiece placed on a work table which can reciprocate in the horizontal direction is moved relatively to a grinding wheel provided at a wheel head. The wheel can move up and down in the vertical direction, and the work is subjected to surface grinding.

Figure 4:
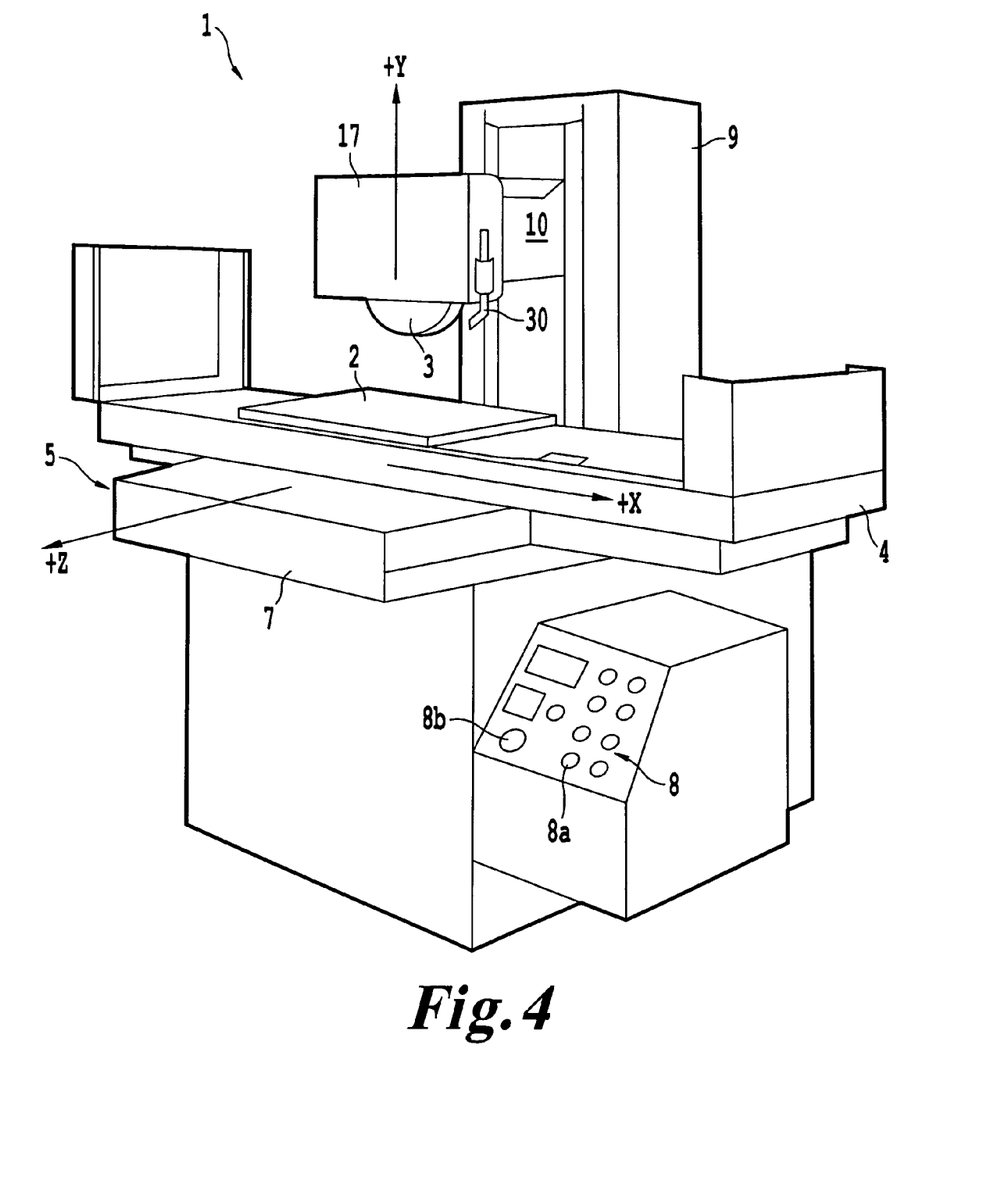
FIG. 4 is perspective view of a conventional grinding apparatus.
Figure 5:
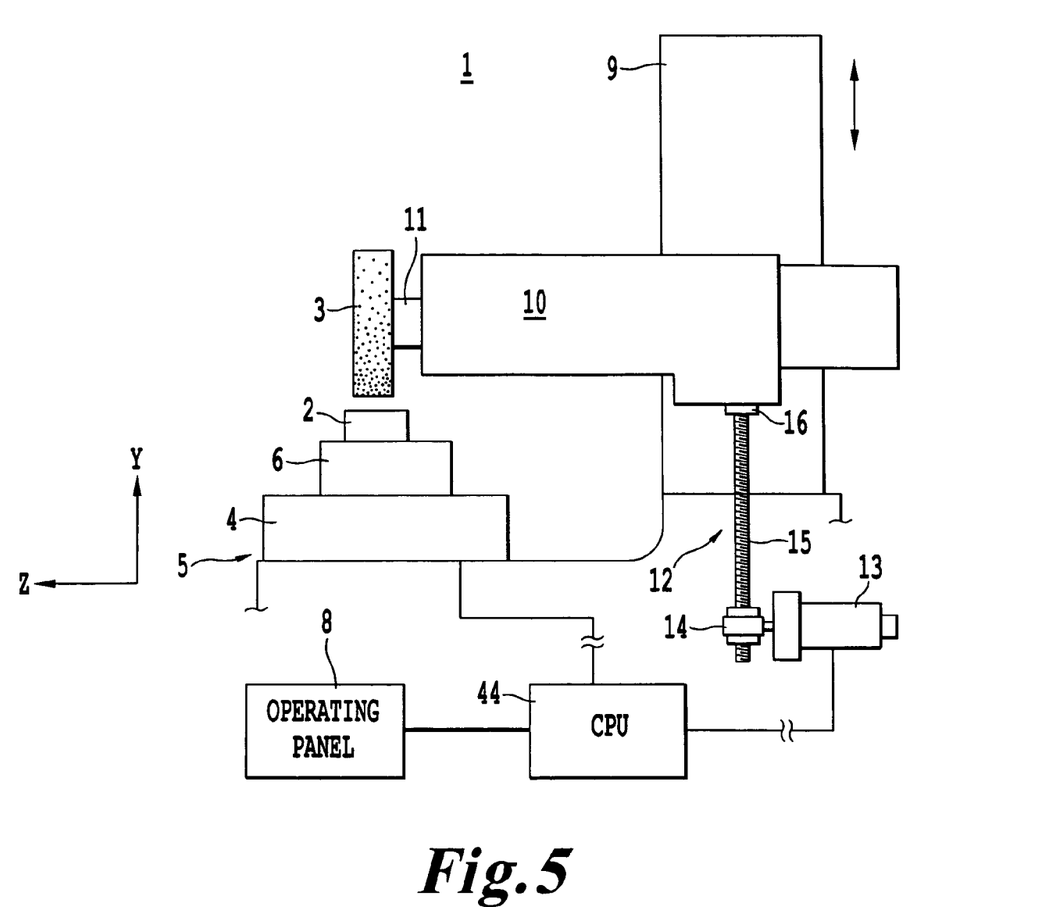
FIG. 5 is a side view of the conventional grinding apparatus.

A surface grinding apparatus 1 shown in FIG. 4 and FIG. 5, has a workpiece 2, a grinding wheel 3, a work table 4 which can reciprocate in the horizontal direction (X-axis direction), a working bench part 5, an electromagnetic chuck 6, a saddle 7 which can reciprocate in the forward/reverse direction (Z-axis direction), an operation panel 8, a grinding wheel cutting start point position detection On-Off switch 8a, a grinding wheel vertical cutting manual pulse generator button 8b, a column 9, a grinding wheel spindle 10, a wheel head 11, a lifting/lowering unit 12 to move the wheel head 11 in the vertical direction (Y-axis direction), a motor 13, an engaging body 14, a ball screw shaft 15, a bearing 16, a safety protection cover 17, an NC control device (CPU) 44 and a grinding liquid supply nozzle 30.

The rotating grinding wheel 3 is lowered to the workpiece 2 on the work table 4 reciprocating in the horizontal direction. The grinding wheel makes a cut in the workpiece, and the work table and the grinding wheel are relatively moved so that grinding is performed. At this time, a grinding liquid is supplied from the nozzle 30 to a working point where the workpiece and the grinding wheel come in contact with each other. A hydraulic drive, combination drive of a ball screw and a servo motor, linear motor drive or the like is used for the horizontal movement of the work table 4. A table reversing mechanism uses dogs (hook-like devices) fixed to both left and right sides of the table, and limit switches fixed to a bed and having an interval narrower than the interval of the dogs.

Figure 6:
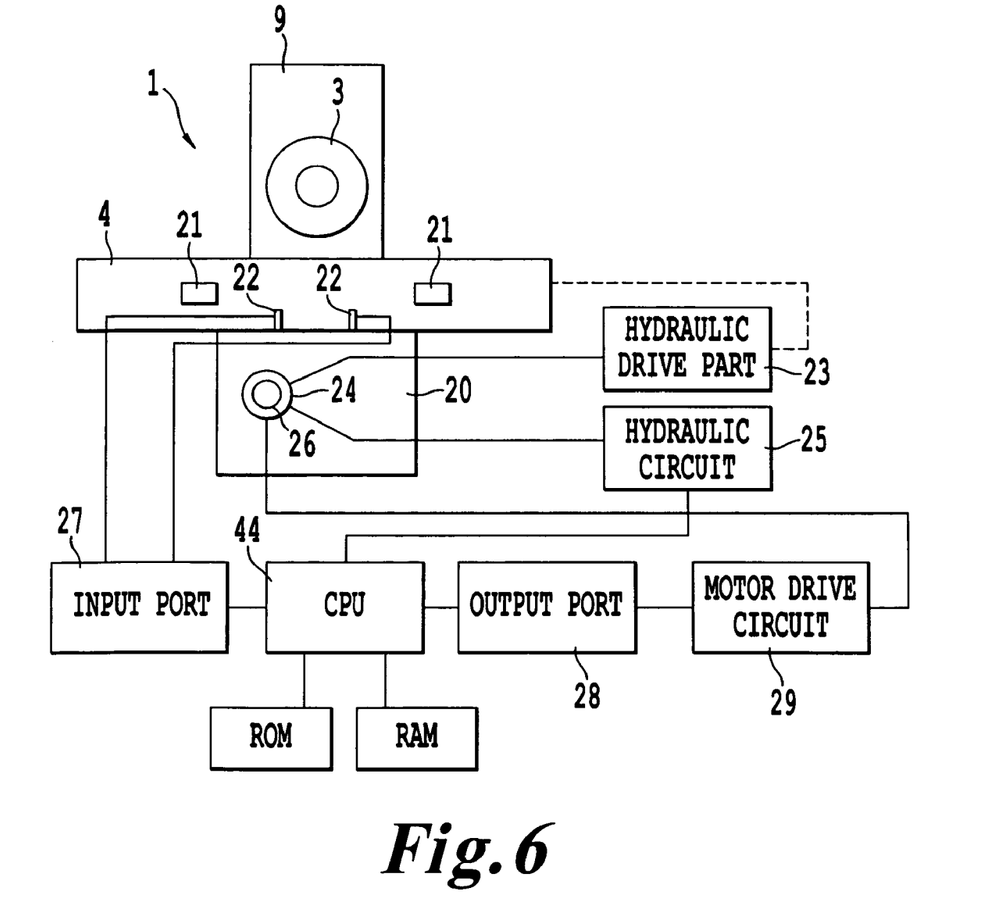
FIG. 6 is a front view of a conventional grinding apparatus having a work table reversing mechanism using dogs of the grinding apparatus.

FIG. 6 shows a grinding apparatus 1 in which a work table is hydraulically operated. Dogs and limit switches are used as a table reversing mechanism. The grinding apparatus 1 shown in FIG. 6 has a grinding wheel 3, a work table 4, a column 9 and an NC control device (CPU) 44 having a storage part (RAM) in which a program is written and a recording part (ROM) in which data and the like are recorded. Reference numeral 20 denotes a bed; 21, dogs; 22, limit switches; 23, a hydraulic drive part; 24, a step motor; 25, a hydraulic circuit; 26, a table speed adjustment throttle valve; 27, an input port; 28, an output port; and 29, a motor drive circuit.

The hydraulic drive part 23 is driven by the hydraulic circuit 25 and moves the work table 4 in the horizontal direction. In the horizontal reverse operation, the dog 21 operates the limit switch 22. When the work table reaches the left end, the right limit switch 22 faces the right dog 21 and is turned on, and the signal of the right limit signal 22 is inputted as a reverse detection signal to the control device 44. Accordingly, a direction switchover valve (not shown) of the hydraulic circuit 25 is operated to change (reverse) the operation direction of the hydraulic drive part 23, that is, the operation direction of the work table 4. The work table starts to move in the right direction and the right dog 21 separates from the right limit switch 22.

When the work table 4 reaches the right end, the left limit switch 22 faces the left dog 21 and is turned on, and the signal of the left limit switch 22 is inputted as the reverse detection signal to the NC control device 44. Accordingly, the direction changeover valve (not shown) of the hydraulic circuit 25 is operated to change (reverse) the operation direction of the hydraulic drive part 23, and thus, the operation direction of the table 4. The table starts to move in the left direction, and the left dog 21 separates from the left limit switch 22. Such operation is alternately continuously performed.

In this conventional table reversing mechanism, because the reverse positions at the left and right of the work table are determined using the dogs and the limit switches, the movement distance of one reciprocation of the work table during grinding of the workpiece is always constant. Thus, when the workpiece has a long body such as a rectangular parallelepiped or a cube and is placed in parallel to the chuck and grinding is performed, shortening of the reciprocating movement distance of the work table is difficult to achieve. However, when the workpiece shape is an irregular shape such as a disk, an L shape, a star shape, an ellipse or a semicircle, or when a long body is placed obliquely to the chuck and grinding the workpiece is performed, there is a rather long empty movement in the horizontal reciprocal movement in which the workpiece is not machined. That is, since the reciprocal movement width of the work table is determined in the light of the longest length of the work, when a long workpiece is machined in one reciprocation of the table, a large fraction of the motion of the grinding wheel is effectively used. However, when a short workpiece is machined, there is much waste in the reversely reciprocating distance of the work table. In other words, the grinding table is inefficient at grinding short or irregularly shaped workpieces because the stroke of the grinding wheel may be too large.

As a method of reduction of net machining time for the grinding process, JP-A-2002-370165 shows a grinding method using a hydrophone in which the total reciprocating movement distance of the work table during grinding can be shortened. With this method, it is unnecessary to input the reverse position of the work table from an operation panel each time. A sound pressure signal received by the hydrophone is made to pass through a band-pass filter. A basic frequency is extracted from the sound pressure signal having passed through this band-pass filter. A time when a value ($P_i$) of the sound pressure signal at the basic frequency reaches a pre-set sound pressure signal ($P_o$) at the basic frequency ($P_i=P_0$) is determined to be a table reverse timing, and reversing of the work table is performed.

The reversing method of the work table using the hydrophone has a benefit in that the total reciprocating movement distance of the work table becomes shorter than that of the reversing method of the work table using the dogs, and grinding time is reduced. However, since the hydrophone receives the sound pressure signal transmitted through the grinding wave, the threshold of the sound pressure signal ($P_o$) at the basic frequency is set to be low to assure safety. Thus, the work table motion is reversed at a position where it is 100 to 200 mm away from a position where the grinding wheel separates from the surface of the workpiece.

SUMMARY OF THE INVENTION

One object of the present invention is to provide a grinding apparatus in which a vibration sensor is used, and a work table can be reversed at a distance where the work table moved by 20 to 75 mm from a position where a grinding wheel separates from a workpiece. Thus, the total reciprocating movement distance of the work table during grinding can be shortened.

According to an aspect of the invention, in a method in which a grinding apparatus is used which grinds a workpiece surface by lifting and lowering a grinding wheel uses horizontal reciprocal movement of a work table on which a chuck to fix a workpiece is mounted. Relative movement of the grinding wheel in a forward/backward (reverse) direction is created. The rotating grinding wheel is lowered to the workpiece surface to make a cut in the workpiece and to grind the workpiece surface. A vibration (an acoustic energy) sensor head installed on a chuck surface in the vicinity of the workpiece detects vibration (acoustic energy) signals emitted from the contact zone between the grinding wheel and the workpiece. When the rotating grinding wheel positions just over the workpiece with little clearance or engages with workpiece, the vibration signals are emitted from the contact zone and the small clearance between the grinding wheel and the workpiece. When a value ($E_i$) of the vibration signal is higher than a previously set trigger value ($E_0$) of the vibration signal, the work table is made to advance in one direction. When the value ($E_i$) of the vibration signal reaches the previously set trigger value ($E_0$) or less of the vibration signal, a reverse signal is transmitted to a drive unit of the work table to reverse the work table.

According to another aspect of the invention, a grinding apparatus includes a work table on which a work is placed, a chuck to fix the work onto the work table, a drive unit to reciprocate the work table in a horizontal direction. This exemplary embodiment also includes a grinding wheel spindle provided to be capable of lifting/lowering in a vertical direction with respect to a surface of the work table, a lifting/lowering unit of the grinding wheel spindle, and a grinding wheel rotatably provided to the grinding wheel spindle. The embodiment also includes a vibration sensor head to detect a vibration signal generated from an interference area of the grinding wheel and the work, an amplifier to amplify the vibration signal detected by the vibration sensor head, a low-pass filter to receive the amplified vibration signal and to allow a specified frequency band to pass through, a recording part to extract a basic frequency from the vibration signal having passed through the low-pass filter and to receive a value ($E_i$) of the vibration signal at the basic frequency. The embodiment further includes a storage part to store a trigger value ($E_0$) of the vibration signal at the basic frequency, a comparison part to compare the value ($E_i$) of the vibration signal with the trigger value ($E_0$) of the vibration signal, and an output part to output a signal to advance the work table in one direction when the value ($E_i$) of the vibration signal at the basic frequency is higher than the trigger value ($E_0$) of the vibration (acoustic energy) signal at the basic frequency. The output part is configured output a reverse signal to the drive unit of the work table when the value ($E_i$) of the vibration signal at the basic frequency reaches the trigger value ($E_0$) or less of the vibration signal at the basic frequency.

Figure 3A:
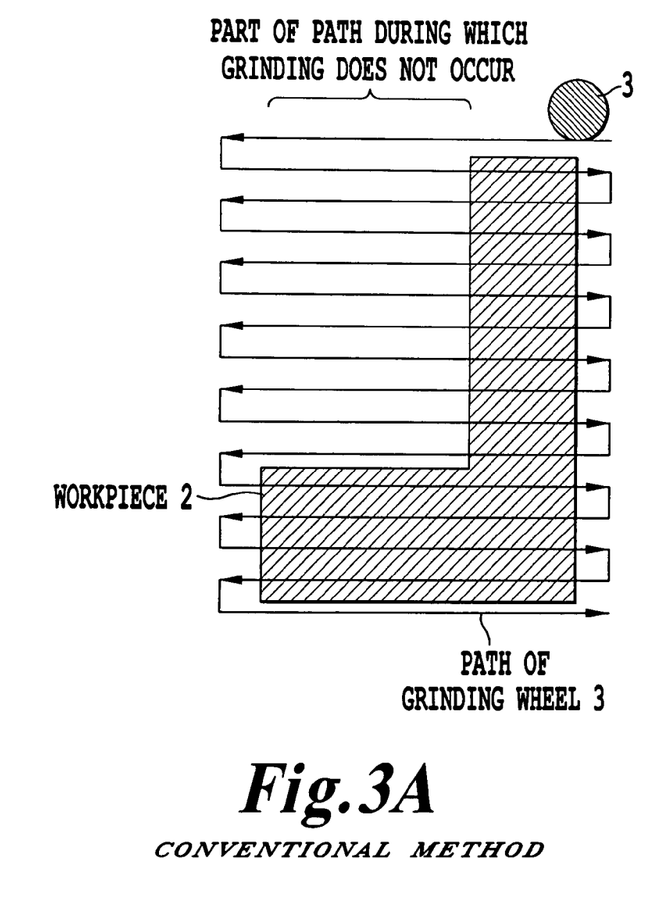
FIG. 3A shows the relative movement distance of the grinding wheel to the L-shaped workpiece by a conventional grinding method.
Figure 3B:
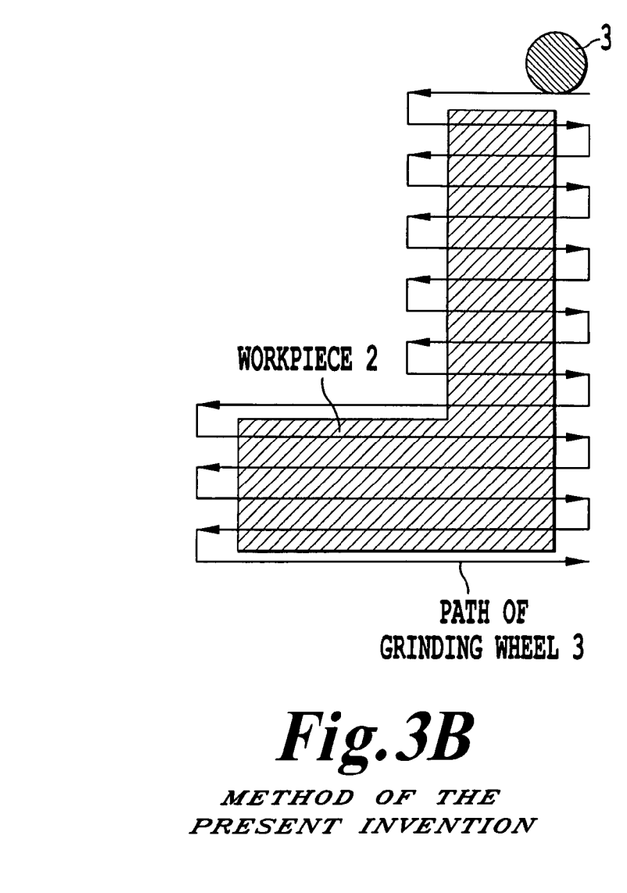
FIG. 3B shows the relative movement distance of the grinding wheel to the L-shaped workpiece in a work table reversing method of an exemplary embodiment of the invention.

When an irregular shaped workpiece of an L shape, a disk shape or the like is machined, in the conventional method, the work table movement is reversed by using the dogs, and the table reverse position must be inputted to the NC control device from the operation panel. Since the table reverse position is determined, as shown in FIG. 3A, there is movement of the work table in an idle (over run) portion where grinding is not performed. On the other hand, in the table reversing method using the vibration sensor according to the invention, a trace or stroke of the work table motion along the workpiece shape becomes possible, and as shown in FIG. 3B, the movement distance of the work table of the idle (over run) portion where grinding is not performed becomes very short. It is decreased by approximately 10 to 38% as compared with the conventional table reversing method using the dogs. Thus, grinding time is shortened, and it becomes unnecessary to input the table reverse position to the NC control device from the operation panel. Accordingly, setup-time is also shortened.

DETAILED DESCRIPTION OF THE INVENTION

Hereinafter, the invention will be described in more detail with reference to the drawings.

Figure 1:
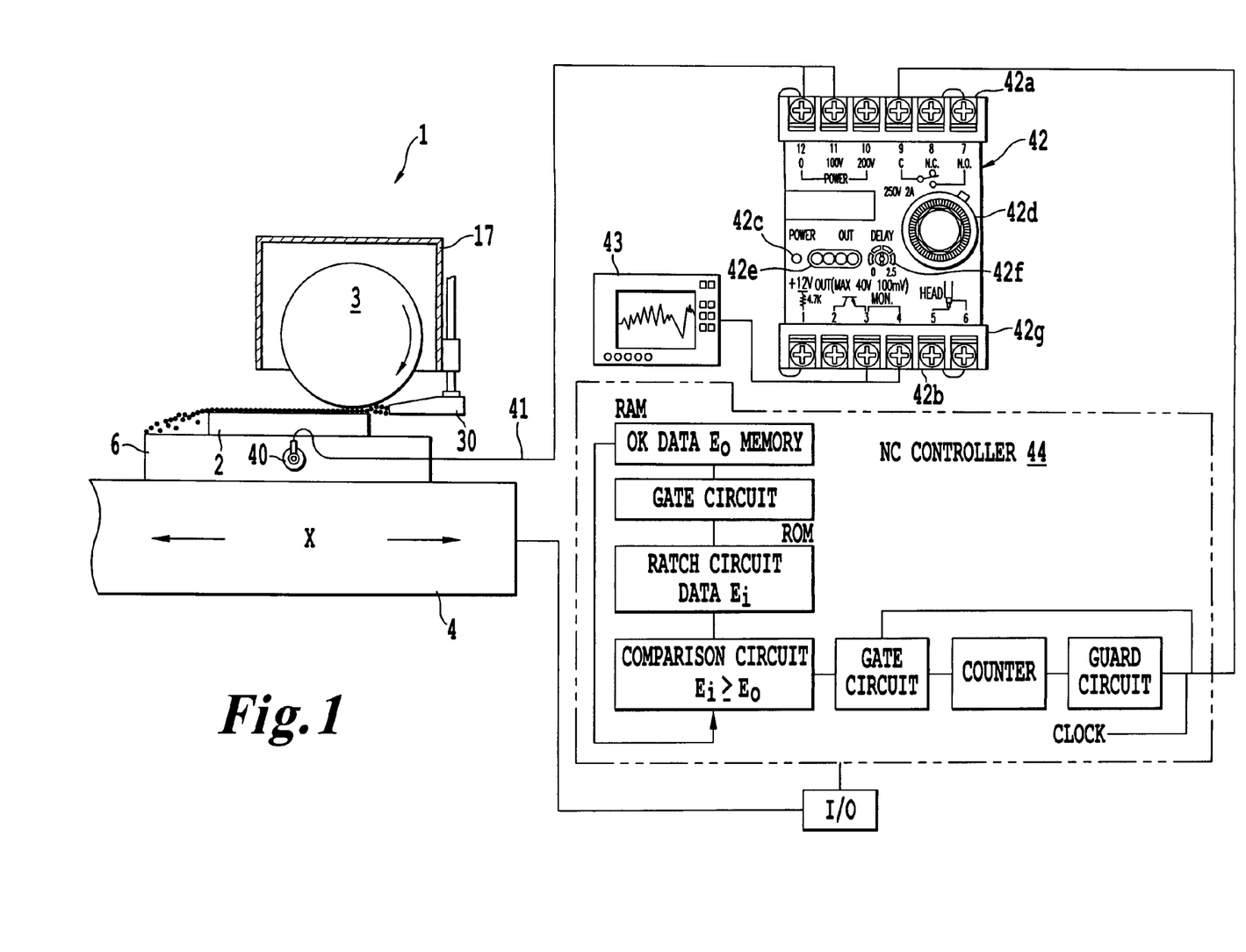
FIG. 1 is a front view of a grinding apparatus of the invention.
Figure 2:
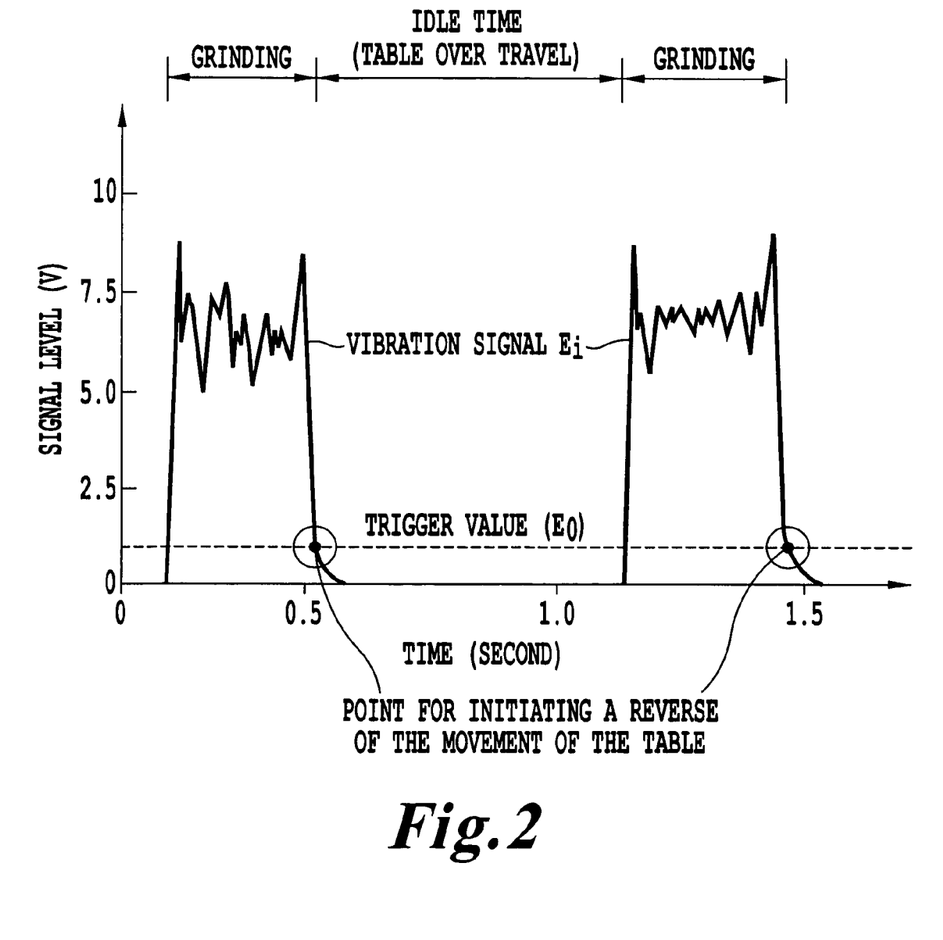
FIG. 2 shows a measurement example of a vibration output signal waveform when traverse grinding is performed.

FIG. 1 is a front view of a grinding apparatus of one non-limiting embodiment of the invention including a vibration (an acoustic energy) sensor to instruct a reverse position of a work table. FIG. 2 shows a measurement example of a vibration output signal waveform when traverse grinding is performed. FIG. 3A shows a relative movement distance of a grinding wheel to an L-shaped work when a conventional grinding method is used. FIG. 3B shows a relative movement distance of a grinding wheel to an L-shaped work in a work table reversing method of the invention.

In FIG. 1, a surface grinding apparatus 1 has a workpiece 2, a grinding wheel 3, a work table 4, an electromagnetic chuck 6, a grinding wheel protective cover 17, a grinding liquid supply nozzle 30, an AE sensor head 40, a lead wire 41, a monitor voltage output device 42, a vibration data display 43 and an NC control device 44 including a control part, a storage part (RAM), a storage part (ROM), a comparison part and an output part. The NC control device 44 is typically sequentially connected through an I/O to a drive mechanism of the work table 4, for example, a servo motor or hydraulic drive part 23 as a movement drive source of the work table.

The vibration sensor head 40 and the monitor voltage output device 42 may be devices such as those sold as the trade name of high precision vibration sensor GA-215, GA-223 by KEYENCE CORPORATION, for example. The monitor voltage output device 42 shown in FIG. 1 may be GA-245 or some other similar device. The vibration sensor head 40 includes an amplification circuit part and a filter. During work grinding, the vibration sensor head 40 installed at the side of the chuck 6 in the vicinity of the work detects a vibration signal generated from the interference area of the grinding wheel 3 and the workpiece 2. This vibration signal is typically amplified by a built-in amplifier and is made to pass through a low-pass filter with a cutoff frequency of 5 to 500 Hz. A basic frequency (for example, 1 Hz, 10 Hz, or 100 Hz) is extracted from the vibration signal having passed through the low-pass filter and is outputted ($E_i$) to the monitor voltage output device 42. As the need arises, it can also be displayed on the vibration data display (for example, an oscilloscope) 43 connected to the monitor voltage output device 42.

The monitor voltage output device 42 includes terminals 42a and 42b, a power source display lamp 42c, a vibration level setting potentiometric dial 42d, a vibration level confirmation lamp 42e, and a monitor output changeover switch 42f. The monitor voltage output device 42 outputs the vibration signal $E_i$ (unit is volts) value outputted from the vibration sensor head 40 to the recording part (ROM) of the NC control device 44 in time series.

The comparison part of the NC control device 44 compares the value ($E_i$) of the vibration signal at the basic frequency with the trigger value ($E_0$) of the vibration signal at the basic frequency stored in the storage part (RAM). When the value ($E_i$) of the vibration signal at the basic frequency is higher than the previously determined trigger value ($E_0$), the work table is advanced in one direction, and when the value ($E_i$) of the vibration signal at the basic frequency reaches the previously set trigger value ($E_0$) or less of the vibration signal at the basic frequency, the reverse signal is transmitted to the drive unit (for example, servo motor, hydraulic cylinder) of the work table 4, and the work table 4 is reversed.

FIG. 2 shows a non-limiting example of a signal output waveform in which the correlation of a time (second) and a vibration signal (unit is volt) at a basic frequency of 100 Hz is taken when the L-shaped workpiece 2 is subjected to traverse grinding. This occurs while the work table 4 is reversed under surface grinding working conditions that the horizontal movement speed of the work table is 300 mm/second, the cutting speed of the grinding wheel is 2.8 mm/second, the speed of the grinding wheel is 31.2 m/second, and the grinding wheel cut amount is 0.002 mm. Of course, other values for the frequency, work table speed, grinding wheel travel speed, grinding wheel rotational speed, and cut amount are possible.

The grinding apparatus 1 grinds the workpiece surface by lifting/lowering of the grinding wheel head 11. The work table 4 on which the chuck 6 to fix the workpiece 2 is mounted is moved back and forth. This causes the relative movement of the grinding wheel 3 in the forward/backward direction. The grinding liquid is sprayed to the work-machining point of the workpiece from the nozzle 30 installed in the vicinity of the grinding wheel 3, and the rotating grinding wheel 3 above the workpiece surface is lowered to the workpiece surface to make a cut in the workpiece and to grind the workpiece surface. At this time, when the workpiece 2 comes into contact with the grinding wheel 3, the vibration signal level is abruptly increased (typically 4 to 9 volts), and when the workpiece 2 separates from the grinding wheel 3, the vibration signal level is abruptly decreased and typically approaches to 0 volt. The trigger value ($E_0$) may be set to 1 volt, for example. When the vibration signal level ($E_i$) at the basic frequency becomes lower than the trigger value ($E_0$), the work table 4 is reversed. Thus, the value of the basic frequency and the trigger value ($E_0$) of the vibration signal at the basic frequency are set in accordance with the shape and size of the workpiece.

Although the attachment position of the vibration sensor head 40 onto the chuck 6 may be the side of the chuck or the upper surface, the side of the chuck is preferable in preventing the grinding liquid from being sprayed to the vibration sensor head 40. In the case where the sensor head is installed on the upper surface of the chuck, it is appropriate that a liquid protective cover 17 is attached to the vibration (AE) sensor head 40. The above-mentioned vibration sensor head 40 of KEYENCE CORPORATION is of a waterproof type.

When a long workpiece 2 is obliquely mounted onto the chuck 6 and traverse grinding is performed, as compared with a conventional method in which the long workpiece 2 is placed on the chuck 6 at the right angle, the grinding time can be shortened by about 40%, and warp removal of the workpiece surface is improved.

The grinding apparatus of the invention can perform the already-described traverse grinding, bias grinding, plunge grinding, shift grinding, or grinding of any combination of these processes. It is a matter of course that the method of reversing the work table by using the vibration sensor can be used for, in addition to the surface grinding apparatus already described as the example, a cylindrical grinding apparatus, and further, the method can be applied to dry grinding not using grinding liquid.

In the method of surface grinding the workpiece, there is also a case where two or more workpieces are brought into close contact and grinding is performed, or the workpiece itself has a groove of 0.01 to 10 mm, and the vibration sensor may detect the groove width or gap so that the work table is reversed. To prevent unwanted reversal of the work table, the filter function of the lead sensor head 40 is used. The time in which the vibration sensor detects the groove width or the gap is lengthened by passing through the low-pass filter with a cutoff frequency of 5 to 500 Hz, and the work table is further advanced in one direction. Thus, the work table can be prevented from reversing prematurely over a groove or gap in the workpiece.

Since the grinding method of the workpiece according to the invention can decrease the idle time (over run) of the work table 4, the overall grinding time of the work can be shortened.

What is claimed is:

1. A method of grinding a workpiece surface of a workpiece using a rotable grinding wheel, where the workpiece is provided on a chuck on a work table and moved reciprocally in the horizontal direction, said method comprising:

detecting vibration signals emitted from a contact zone between the grinding wheel and the workpiece;

moving the work table in a moving direction when a value ($E_i$) of the vibration signal is higher than a previously set trigger value ($E_0$) of the vibration signal; and transmitting a reverse signal to a drive unit of the work table to reverse a moving direction of the work table when the value ($E_i$) of the vibration signal reduces to a value equal to or below the previously set trigger value ($E_0$).

2. The method of claim 1, further comprising moving the workpiece reciprocally relative to the grinding wheel.

3. The method of claim 1, further comprising filtering the vibration signals with a low-pass filter.

4. The method of claim 3, wherein the filtering prevents the transmitting of a reverse signal when the grinding wheel is above a gap in the workpiece.

5. The method of claim 4, wherein the filtering blocks vibrations above a cutoff frequency from being detected and the cutoff frequency is between 5 and 500 Hz.

6. The method of claim 4, wherein the width of the gap in the workpiece, measured in a direction of travel of the grinding wheel, is 0.01 to 10 mm.

7. The method of claim 1, further comprising extracting a basic frequency from the vibration signal.

8. The method of claim 7, wherein the basic frequency is between 1 and 100 Hz.

9. The method of claim 1, wherein vibration signals are detected with a vibration sensor head installed on a surface of the chuck.

10. A grinding apparatus comprising:

a work table;

a chuck provided on the work table and configured to receive a workpiece;

a drive unit configured to reciprocate the work table in a first direction;

a grinding wheel spindle configured to move a grinding wheel in a second direction substantially perpendicular to a surface of the work table;

a vibration sensor head configured to detect a vibration signal generated from an interference area of the grinding wheel and the workpiece;

a comparison part configured to compare the value ($E_i$) of the vibration signal with the trigger value ($E_0$) of the vibration signal; and an output part configured to output a signal to advance the work table in a first direction when the value ($E_i$) of the vibration signal at the basic frequency is higher than the trigger value ($E_0$) of the vibration signal at the basic frequency, and to output a reverse signal to the drive unit of the work table in a second direction when the value ($E_i$) of the vibration signal at the basic frequency reaches the trigger value ($E_0$) or less of the vibration signal at the basic frequency.

11. The grinding apparatus of claim 10, further comprising a low-pass filter configured to receive the amplified vibration signal and to allow a specified frequency band to pass there-through.

12. The grinding apparatus of claim 11, wherein the low-pass filter has a cut-off frequency between 5 and 500 Hz.

13. The grinding apparatus of claim 10, further comprising a protective cover near the vibration sensor head.

14. The grinding apparatus of claim 10, further comprising an amplifier configured to amplify the vibration signal detected by the vibration sensor head.

15. The grinding apparatus of claim 10, further comprising a recording part configured to extract a basic frequency from the vibration signal having passed through the low-pass filter and to receive a value ($E_i$) of the vibration signal at the basic frequency.

16. The grinding apparatus of claim 10, further comprising a storage part configured to store a trigger value ($E_0$) of the vibration signal at the basic frequency.

17. A grinding apparatus comprising:

a work table;

a chuck provided on the work table and configured to receive a workpiece;

a drive unit configured to reciprocate the work table in a first direction;

a grinding wheel spindle configured to move a grinding wheel in a second direction substantially perpendicular to a surface of the work table;

means for detecting vibration signals emitted from a contact zone between the grinding wheel and the workpiece;

means for determining, based on the vibration signals, whether the grinding wheel is grinding the workpiece.

18. The apparatus of claim 13, wherein the means for determining includes a means for comparing the vibration signals to a preset vibration frequency.

* * * * *